United States Patent [19]
Bannister et al.

[11] Patent Number: 5,775,091
[45] Date of Patent: Jul. 7, 1998

[54] HYDROGEN FUELED POWER PLANT

[75] Inventors: Ronald Leo Bannister, Winter Springs, Fla.; Richard Allen Newby, Pittsburgh; Wen Chin Yang, Export, both of Pa.

[73] Assignee: Westinghouse Electric Corporation, Pittsburgh, Pa.

[21] Appl. No.: 734,153

[22] Filed: Oct. 21, 1996

[51] Int. Cl.$^6$ ............................................. F02C 3/22
[52] U.S. Cl. .................... 60/39.05; 60/39.17; 60/39.465
[58] Field of Search ................ 60/39.05, 39.17, 60/39.182, 39.465, 39.55, 39.59, 39.75

[56] References Cited

U.S. PATENT DOCUMENTS

| | | | |
|---|---|---|---|
| 4,148,185 | 4/1979 | Somers | 60/39.17 |
| 4,424,668 | 1/1984 | Mukherjee | 60/39.182 |
| 5,331,806 | 7/1994 | Warkentin | 60/39.465 |
| 5,412,937 | 5/1995 | Tomlinson et al. | 60/39.02 |
| 5,488,825 | 2/1996 | Davis et al. | 60/39.75 |
| 5,491,971 | 2/1996 | Tomlinson et al. | 60/39.182 |
| 5,511,937 | 4/1996 | Papageorgiou | 415/115 |
| 5,613,536 | 3/1997 | Frutschi | 60/39.182 |

FOREIGN PATENT DOCUMENTS

| | | |
|---|---|---|
| WO9607019A | 3/1996 | WIPO . |
| WO9731184A | 8/1997 | WIPO . |

OTHER PUBLICATIONS

H.J. Sternfeld, "VDI Berichte 602–Wasserstoff–Energieterhnik", VDI Verlag, Dusseldorf DE XP002047184, Mar. 1987, pp. 232–247.

Bannister et al., "A Hydroen–Fueled Combustion Turbine Designed for Greater Than 60% (HHV) Efficiency", Canadian Electrical Association, Thermal and Nuclear Section, Apr. 1996, Montreal.

Bannister et al., "Hydrogen–Fueled Combustion Turbine Cycles", presented at the International Gas Turbine and Aeroengine Congress & Exhibition, Birmingham, UK, Jun. 10–13, 1996.

World Energy NETwork (WE–NET) Brochure, published by NEDO (New Energy and Industrial Technology Development Organization), Japan, 1993.

S.P. Malyshenko et al., "Thermodynamic Aspects of the Use of Hydrogen for Solving Certain Problems Facing the Power Industry", *Thermal Engineering*, 33 (10), 1986, pp. 553–557.

*Primary Examiner*—Louis J. Casaregola

[57] ABSTRACT

A power plant that combusts hydrogen with oxygen in a high pressure combustor to produce steam, which is mixed with cooling steam before being sent to a high pressure expander, which expands the steam and generates rotating shaft power. The expanded steam is mixed with steam from the combustion of hydrogen and oxygen in an intermediate pressure combustor and expanded in an intermediate pressure turbine, thus generating more rotating shaft power. The steam from the intermediate pressure turbine is fed into a heat recovery steam generator that cools the steam and heats water streams to form cooling steam for at least one of the turbines and the combustors. The now cooled steam exits the steam generator and passes through a low pressure turbine, thereby generating more rotating shaft power, and is condensed into the water streams for heating into cooling steam in the steam generator.

21 Claims, 7 Drawing Sheets

HYDROGEN FUELED POWER PLANT

BACKGROUND OF THE INVENTION

1. Field of the Invention

The present invention relates to a power plant using hydrogen and oxygen as the fuel.

2. Description of the Related Art

Power plants have a combustion section where a hydrocarbon fuel, such as distillate oil or natural gas, is mixed with and burned in the compressed air in one or more combustors. Unfortunately, such combustion results in the formation of oxides of nitrogen ("NOx"), carbon dioxide ($CO_2$), carbon monoxide (CO), and other trace constituents considered atmospheric pollutants. Combusting hydrogen in pure oxygen eliminates the formation of NOx, $CO_2$, CO, and other trace constituents considered atmospheric pollutants. Combustors for rocket engines have traditionally operated by combusting liquid hydrogen in liquid oxygen. However, power turbines must operate for extended periods of time without deterioration. Consequently, the problems of cooling the combustor in a gas turbine presents challenges not present in rocket combustors. This problem is exacerbated if, for reasons of economy and ease of handling and supply, compressed oxygen gas, rather than liquid oxygen, is used. Typically, rocket combustors rely on the low temperature of liquid oxygen for cooling.

Cooling of the turbine section is also a problem in a hydrogen/oxygen fueled power plant, especially since it is desirable to operate the turbine with inlet temperatures as high as 900° to 1600° C. in order to achieve optimum power output. The cooling traditionally used in combustion turbines negatively impacts the efficiency of the power plant.

It is, therefore, desirable to provide a high efficiency power plant that generates energy from the combustion of hydrogen and oxygen.

SUMMARY OF THE INVENTION

Accordingly, it is the general object of the current invention to provide a hydrogen combustion power plant for effectively and efficiently cooling turbine components with an open- or closed-loop steam cooling system.

Briefly, this object, as well as other objects of the current invention, is accomplished in a method of generating rotating shaft power by feeding a first flow of cooling steam, hydrogen, and oxygen into a high pressure combustor and combusting the hydrogen and oxygen to form a high pressure steam. The high pressure steam is cooled with the first flow of cooling steam to produce a first flow of process steam. The first flow of process steam is expanded in a high pressure turbine, thereby generating a second flow of process steam and rotating shaft power. The second flow of process steam is mixed with a third flow of cooling steam from an intermediate pressure turbine and fed into an intermediate pressure combustor, where it is mixed with steam from the combustion of hydrogen and oxygen in the intermediate pressure combustor to form a third flow of process steam. The third flow of process steam is fed into the intermediate pressure turbine to form a fourth flow of process steam and generate rotating shaft power. The intermediate pressure turbine is cooled by a second flow of cooling steam, which exits the turbine as the third flow of cooling steam. The fourth flow of process steam is passed through a heat recovery steam generator to heat up two streams of feed water to produce the first and second flows of cooling steam. The fourth flow of process steam is cooled in the steam generator and becomes a fifth flow of process steam, which is fed into a low pressure turbine. The low pressure turbine generates rotational shaft power and releases the expanded fifth flow of process steam as a sixth flow of process steam. The sixth flow of process steam is condensed, the excess water bled off, and the remaining water is pumped to the steam generator to become cooling steam.

DESCRIPTION OF THE PREFERRED EMBODIMENT

Figure 1:
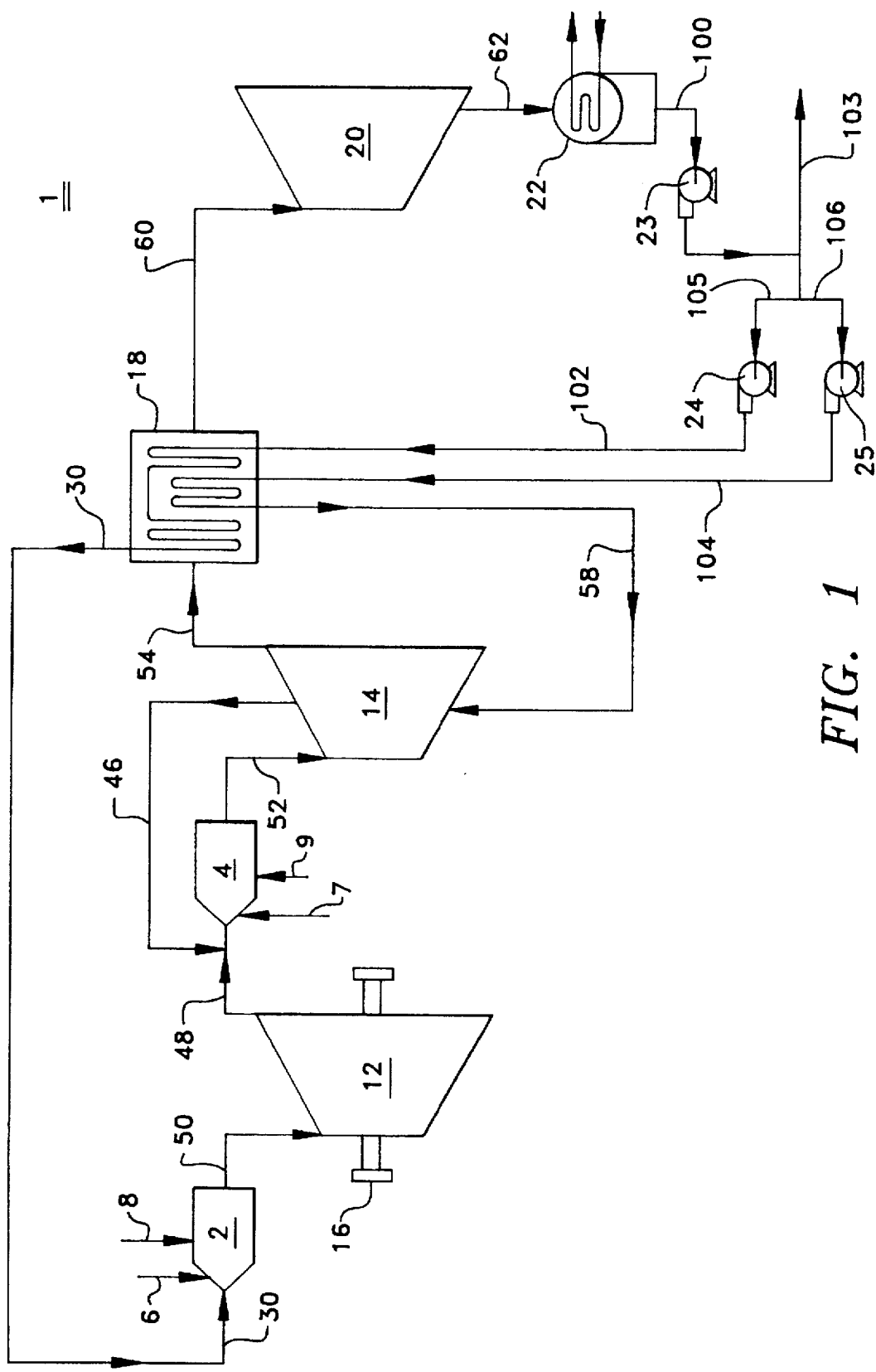
FIG. 1 is a schematic diagram of a hydrogen fueled power plant employing a closed-loop steam cooling system in the intermediate pressure turbine.

Referring to the drawings, wherein like reference numerals refer to like elements, there is shown in FIG. 1 a hydrogen fueled power plant 1. The major components of the plant 1 are a high pressure combustor 2, a high pressure steam turbine 12 through which a rotor shaft 16 extends, an intermediate pressure combustor 4, an intermediate pressure steam turbine 14, a heat recovery steam generator 18, a low pressure steam turbine 20, and a condenser 22. As is typical, each of the turbines drives a load, such as an electrical generator (not shown).

Figure 6:
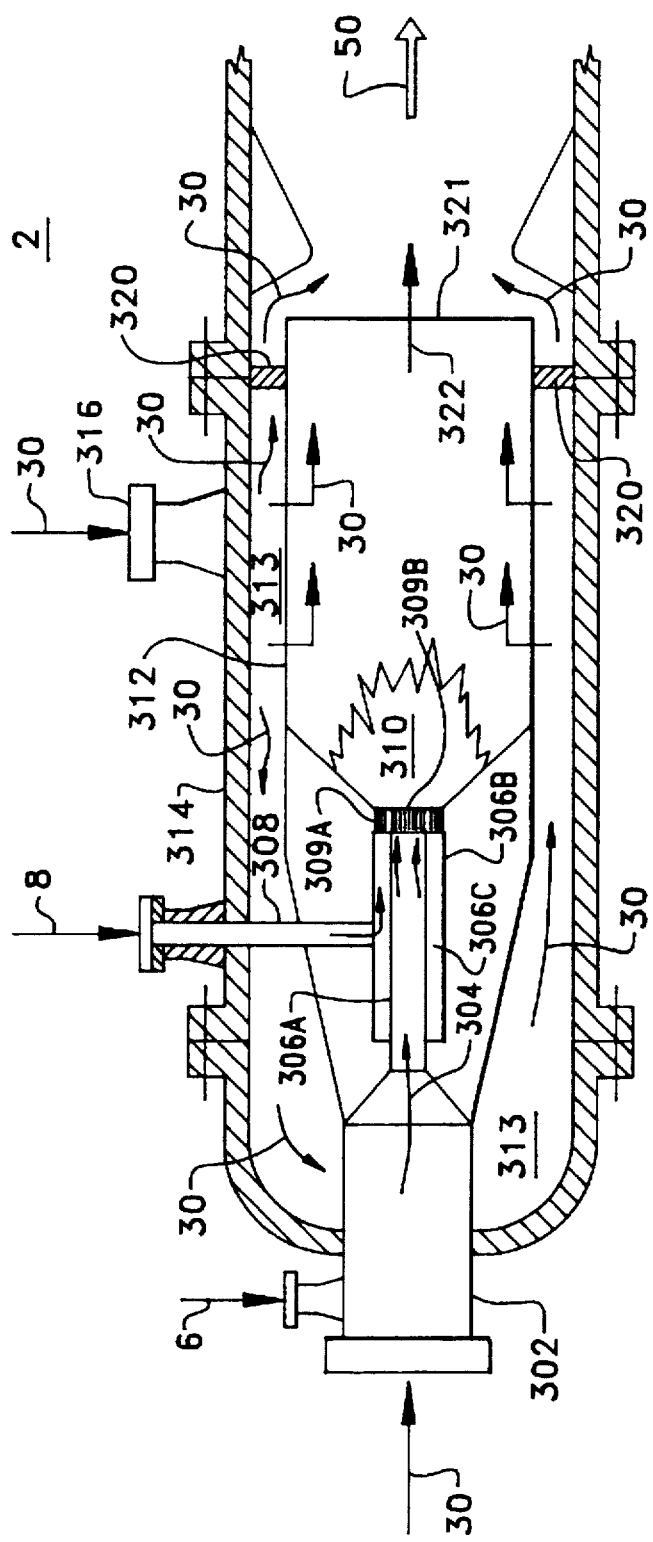
FIG. 6 is a schematic sectional view of a high pressure combustor.

The high pressure combustor 2 receives a first flow of hydrogen 6 and a first flow of oxygen 8, which may be in either gaseous or liquid—i.e., cryogenic—form. If the hydrogen 6 and oxygen 8 are in gaseous form, compressors may be utilized to pressurize the gas. In the high pressure combustor 2, the hydrogen 6 and oxygen 8 combust to form high temperature, high pressure steam. Preferably, the combustion takes place at close to stoichiometric conditions so that the combustion results in essentially pure steam. A first flow of cooling steam 30, generated as discussed below, is also supplied to the high pressure combustor 2. The cooling steam 30 mixes with the steam produced by the combustion of the hydrogen 6 and oxygen 8, thereby preventing overheating of the combustor 2 components and producing a first flow of process steam 50. Now referring to FIG. 6, in the preferred embodiment of the invention, a portion of the cooling steam 30 and the hydrogen 6 are premixed in an inlet chamber 302 of the combustor 2, thus forming a low value heating fuel 304. The fuel 304 flows through an axially located tube 306A which is surrounded by a tube 306B to form annulus 306C. Oxygen 8 flows through the radially located tube 308 to enter annulus 306C. The fuel and oxygen flow through swirlers 309A and 309B, creating an intensely back-mixed combustion zone 310 that produces combustion products 322. The temperature in the combustion zone being approximately 1600° C. Another portion of the steam 30 passes into the combustor through an orifice 316 and circulates in a space 313 between the shell 314 and the liner 312, thereby cooling the liner. The liner 312 is also cooled by some of the steam 30 passing therethrough. The majority of steam 30 in the space 313 passes through swirlers 320 surrounding outlet 321 of the combustion zone 310, thereby diluting the combustion products 322 exiting therefrom and forming the first flow of process steam 50.

Now referring to FIG. 1, the mass flows into the high pressure combustor 2 are such that the first flow of process steam 50 has a temperature range of 500° C. to 900° C. and a pressure range of 200 bar to 500 bar. The lower temperature limit of 500° C. is the minimum required to achieve a good overall plant heat rate. The upper temperature limit of 900° C. is the maximum for the high pressure turbine 12 to operate without cooling. Turbine 12 cooling is made redundant at the upper end of the temperature range through the use of advanced alloys in the fabrication of the turbine. Preferably, the temperature of the first flow of process steam 50 is approximately 650° C. The pressure range of the first flow of process steam 50 enables good thermal efficiency and work based on previous commercial use of steam turbines. Preferably, the pressure of the first flow of process steam 50 is approximately 300 bar.

The high pressure steam turbine 12 receives the first flow of process steam 50 from the high pressure combustor 2. Preferably, the combustor 2 is located external to the turbine 12 but closely coupled with the turbine 12. The process steam 50 is expanded in turbine 12, thereby generating shaft power in the rotor shaft 16 and producing a second flow of process steam 48. Preferably, turbine 12 has 12 rows of blades whose heights vary from approximately 0.9 to approximately 2.6 inches. The process steam 48 is discharged from the high pressure turbine 12 at approximately 40 bar, a pressure suitable for the intermediate pressure combustor 4.

The intermediate pressure combustor 4 receives the second flow of process steam 48 after is mixed with a third flow of cooling steam 46, which is produced as discussed below. The intermediate pressure combustor 4 also receives a second flow of hydrogen 7 and a second flow of oxygen 9 that is combusted therein into steam. The steam is mixed with the process steam 48 and the cooling steam 46, thereby preventing overheating of the combustor 4 components and producing a third flow of process steam 52.

Figure 7:
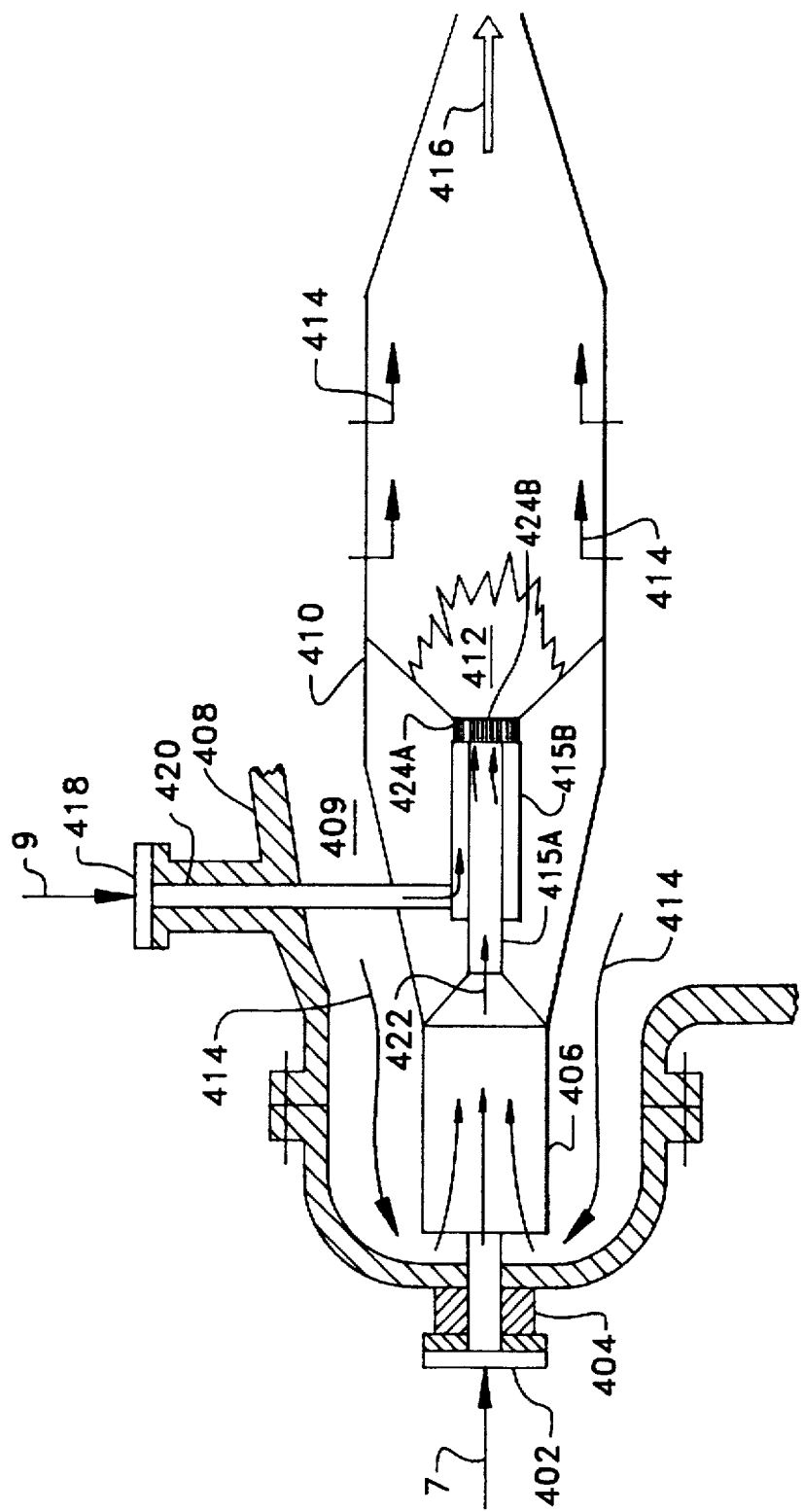
FIG. 7 is a schematic sectional view of an intermediate pressure combustor.

Referring now to FIG. 7, in the preferred embodiment of the invention, intermediate pressure combustor 4 receives hydrogen 7 through an orifice 402 of an axially located tube 404. The combustor 4 also receives cooling steam 46 and process steam 48 (not shown), which is combined into steam 414. Steam 414 flows through a space 409 between shell 408 and liner 410 of the combustor, cooling the combustor. A portion of the steam 414 flows through the liner 410, cooling the liner. The remainder of the steam 414, and the hydrogen 7, flows into a premixing chamber 406 to form a low value fuel 422. The fuel 422 passes out of the chamber 406 and through an axially located tube 415A which is surrounded by a tube 415B. The radially located tube 420 delivers oxygen 9 to the tube 415B. The oxygen is delivered into radially located tube 420 by an orifice 418. The streams of oxygen 9 and fuel 422 flow through swirlers 424A and 424B, creating an intensely back-mixed zone 412 that produces combustion products 416.

Referring now to FIG. 1, the third flow of process steam 52 has a temperature range of approximately 1500° C. to approximately 1700° C. and a pressure range of approximately 20 bar to approximately 40 bar. The lower temperature limit of approximately 1500° C. is to achieve good thermal efficiency. The upper temperature limit of approximately 1700° C. is the limit of a steam cooled turbine. Preferably, the temperature of the third flow of process steam 52 is approximately 1700° C. The pressure range of the third flow of process steam 52 enables good thermal efficiency and work based on previous commercial use of steam turbines. Preferably, the pressure of the third flow of process steam 52 is approximately 39 bar.

The intermediate steam turbine 14 receives the third flow of process steam 52 discharged from the intermediate combustor. The process steam 52 is then expanded, thereby producing additional shaft power and a fourth flow of process steam 54. Preferably, the process steam 54 discharged from the intermediate pressure turbine 14 is approximately 1 bar.

The heat recovery steam generator 18 receives the fourth flow of process steam 54 from the intermediate turbine 14. Within the steam generator 18, a portion of the heat of the process steam 54 is transferred to a high pressure feedwater stream 102 and a low pressure feedwater stream 104. This transfer of heat cools the fourth flow of process steam 54 which is released from the steam generator as a fifth flow of process steam 60. Preferably, sufficient heat is transferred in the heat recovery steam generator 18 so that the process steam 60 discharged therefrom has been cooled to approximately 110° C.

The heat recovery steam generator 18 also produces the first flow of cooling steam 30 from the high pressure feedwater stream 102 and the second flow of cooling steam 58 from the low pressure feedwater stream 104, as described below. The first flow of cooling steam 30 is sent to the high pressure combustor 2 at approximately 440° C. and approximately 470 bar.

The second flow of cooling steam 58 is used to cool the intermediate pressure turbine 14. In the embodiment of the invention shown in FIG. 1, the intermediate pressure turbine 14 has a closed-loop steam cooling system, as described below and shown in FIGS. 4 and 5. In a closed-loop steam cooling system, the cooling steam flows through the components of the turbine without coming into contact with the process steam being expanded in the turbine. Therefore, as the second flow of cooling steam 58 flows through the turbine 14, it is heated and flows out of the turbine as the third flow of cooling steam 46. With a closed-loop steam cooling system, the second flow of cooling steam 58 is approximately 260° C. and approximately 45 bar.

In other embodiments of the invention, turbine 14 has an open-loop steam cooling system. An open-loop steam cooling system cools the stationary vanes or the rotating blade airfoils in a turbine by flowing cooling steam through the components and into the process steam flowing through the turbine. Typical open-loop steam cooling of these turbine components is disclosed in the commonly assigned U.S. Pat. No. 5,488,825 to Davis et al. entitled "Gas Turbine Vane with Enhanced Cooling," and U.S. Pat. No. 5,511,937 to Papageorgiou entitled "Gas Turbine Airfoil with a Cooling Air Regulating Seal," both of which are incorporated by reference herein in their entireties. As the cooling steam flows into the process steam, there is no third flow of cooling steam 46 in the embodiment of the invention having an open-loop steam cooling system in intermediate pressure turbine 14 (not shown). The operating parameters of the hydrogen fueled power plant 1 with an open-loop cooling system in the intermediate pressure turbine 12 will need to be modified from the operating parameters of the plant with a closed-loop steam cooling system in the turbine.

The low pressure turbine 20 receives the fifth flow of process steam 60, where it is further expanded to produce still more shaft power and a sixth flow of process steam 62. Preferably, the process steam 62 is approximately 35° C. and approximately 0.1 bar.

A condenser 22 receives the process steam 62 and condenses it into a feedwater stream 100. The feedwater stream 100 is split into a first portion 105, a second portion 106, and an excess portion 103. The first and second portions 105 and 106 are directed to high pressure feedwater pump 24 and low pressure feedwater pump 25, respectively. The excess portion 103 is bled off because water needs to be released from the power plant 1 to counteract the steam added to the plant by the reaction of hydrogen and oxygen.

The high pressure feedwater pump 24 boosts the pressure of the first portion 105 of the feedwater stream to produce a high pressure water stream 102. Preferably, the pressure of water stream 102 is in excess of the pressure of the first flow of process steam 50. The high pressure water stream 102 is received by the heat recovery steam generator 18. In the generator 18, the water stream 102 becomes the first flow of cooling steam 30.

The low pressure feedwater pump 25 boosts the pressure of the second portion of the feedwater stream 106 to produce a low pressure water stream 104. The pressure of water stream 104 is in excess of the pressure of the third flow of process steam 52. The low pressure water stream 104 is received by the heat recovery steam generator 18. In the generator 18, the water stream 104 becomes the second flow of cooling steam 58.

For a 500 megawatt power plant, the invention has an efficiency of about 61% based on high hydrogen heating values and 73% based on low hydrogen heating values.

Figure 2:
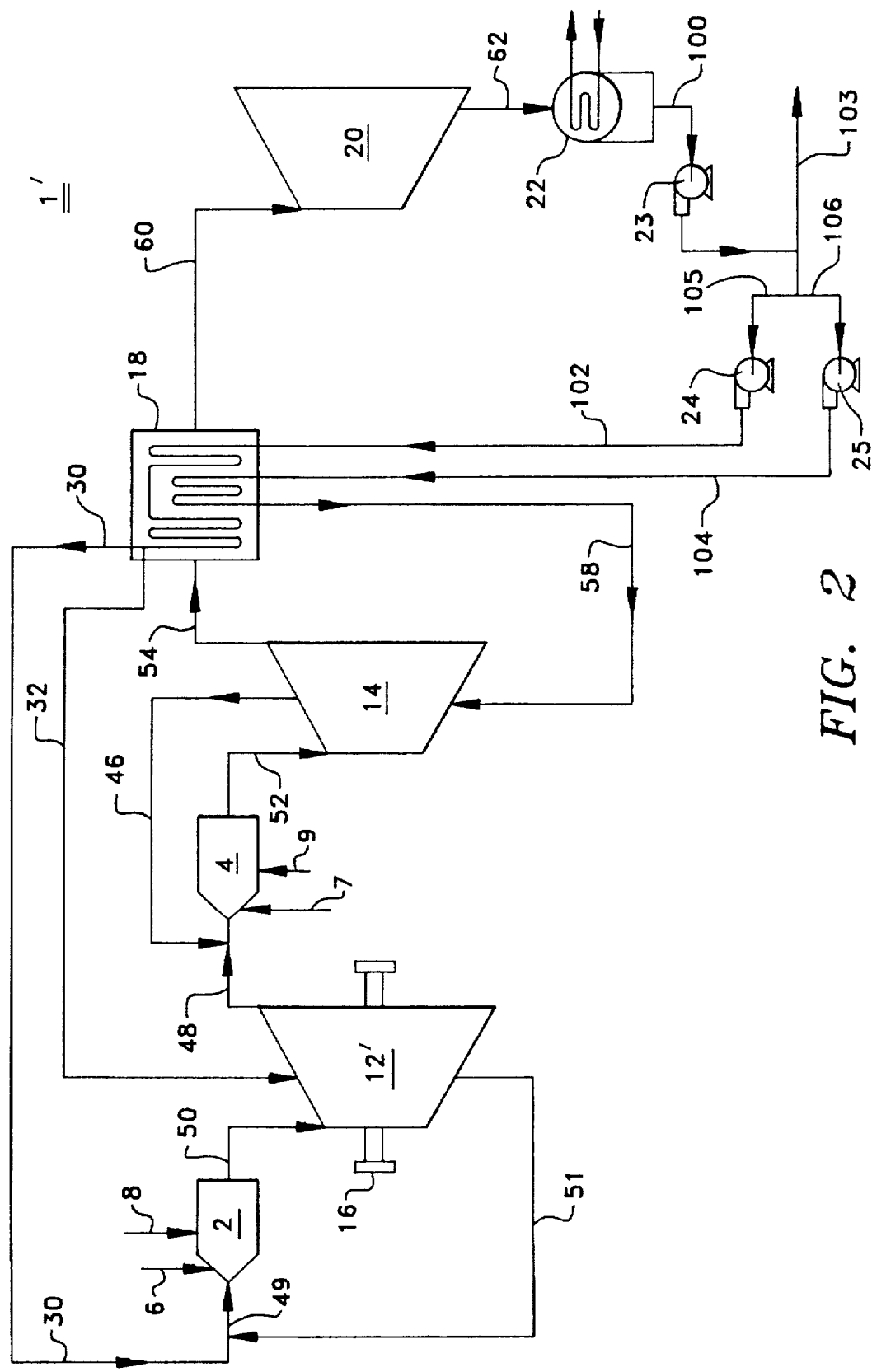
FIGS. 2 and 3 are a schematic diagram of a hydrogen fueled power plant employing closed-loop steam cooling system in the high and intermediate pressure turbines.

Now referring to FIG. 2, power plant 1' is another embodiment of the invention and is similar to power plant 1. The main physical difference between the two power plants is that turbine 12', which replaces turbine 12, is cooled by a fourth flow of cooling steam 32. Cooling steam 32 is generated by the heater recovery steam generator 18 heating the high pressure water stream 102 and splitting it into the first flow of cooling stream 30 and the fourth flow of cooling steam 32. The fourth flow of cooling gas 32 is then used to cool the high pressure turbine 12'.

In the embodiment of the invention as disclosed in FIG. 2, a closed-loop cooling system is used to cool the high pressure turbine 12', as described below and shown in FIGS. 4 and 5. In a closed-loop steam cooling system, the cooling steam flows through the components of the turbine without coming into contact with the process steam being expanded in the turbine. Therefore, as the fourth flow of cooling steam 32 flows through the turbine 12', it is heated and flows out of the turbine as the third fifth flow of cooling steam 51. The fifth flow of cooling steam 51 is mixed with the first flow of cooling steam 30 to become a combined flow of cooling steam 49. The high pressure combustor 2 receives the combined flow of cooling steam 49. The cooling steam 49 mixes with the steam produced by the combustion of the hydrogen 6 and oxygen 8, thereby preventing overheating of the combustor 2 components and producing a first flow of process steam 50.

In other embodiments of the invention, either or both turbine 12' and turbine 14 has an open-loop steam cooling system, as previously discussed. This will result in no third flow of cooling steam 46 if the turbine 14 has an open-loop cooling system and no fifth flow of cooling steam 51 if the turbine 12' has an open-loop cooling system (not shown).

The operating parameters of the hydrogen fueled power plant 1' with an open-loop cooling system in either or both of the turbines 12' and 14 will need to be modified from the operating parameters of the plant 1' with closed-loop steam cooling systems.

The cooling of the high pressure steam turbine 12' with the fourth flow of cooling steam 32 results in different preferred temperatures and pressures of the other flows of steam of power plant 1' compared to power plant 1. The preferred temperatures and pressures of power plant 1' are disclosed in Table I below.

TABLE 1

PREFERRED TEMPERATURE AND PRESSURES OF STEAM FLOWS OF POWER PLANT 1'

| STEAM FLOW | PREFERRED APPROXIMATE TEMPERATURE (°C.) | PREFERRED APPROXIMATE PRESSURE (bar) |
|---|---|---|
| First Flow of Process Steam 50 | 1600 | 250 |
| Second Flow of Process Steam 48 | 935 | 25 |
| Third Flow of Process Steam 52 | 1600–1700 | 24 |
| Fourth Flow of Process Steam 54 | 840 | 1 |
| Fifth Flow of Process Steam 60 | 110 | 1 |
| Sixth Flow of Process Steam 62 | 33 | 0.05 |
| First Flow of Cooling Steam 30 | 400 | 260 |
| Second Flow of Cooling Steam 58 | 375 | 30 |
| Third Flow of Cooling Steam 46 | 650 | 27 |
| Fourth Flow of Cooling Steam 32 | 400 | 310 |
| Fifth Flow of Cooling Steam 51 | 650 | 280 |

Figure 3:
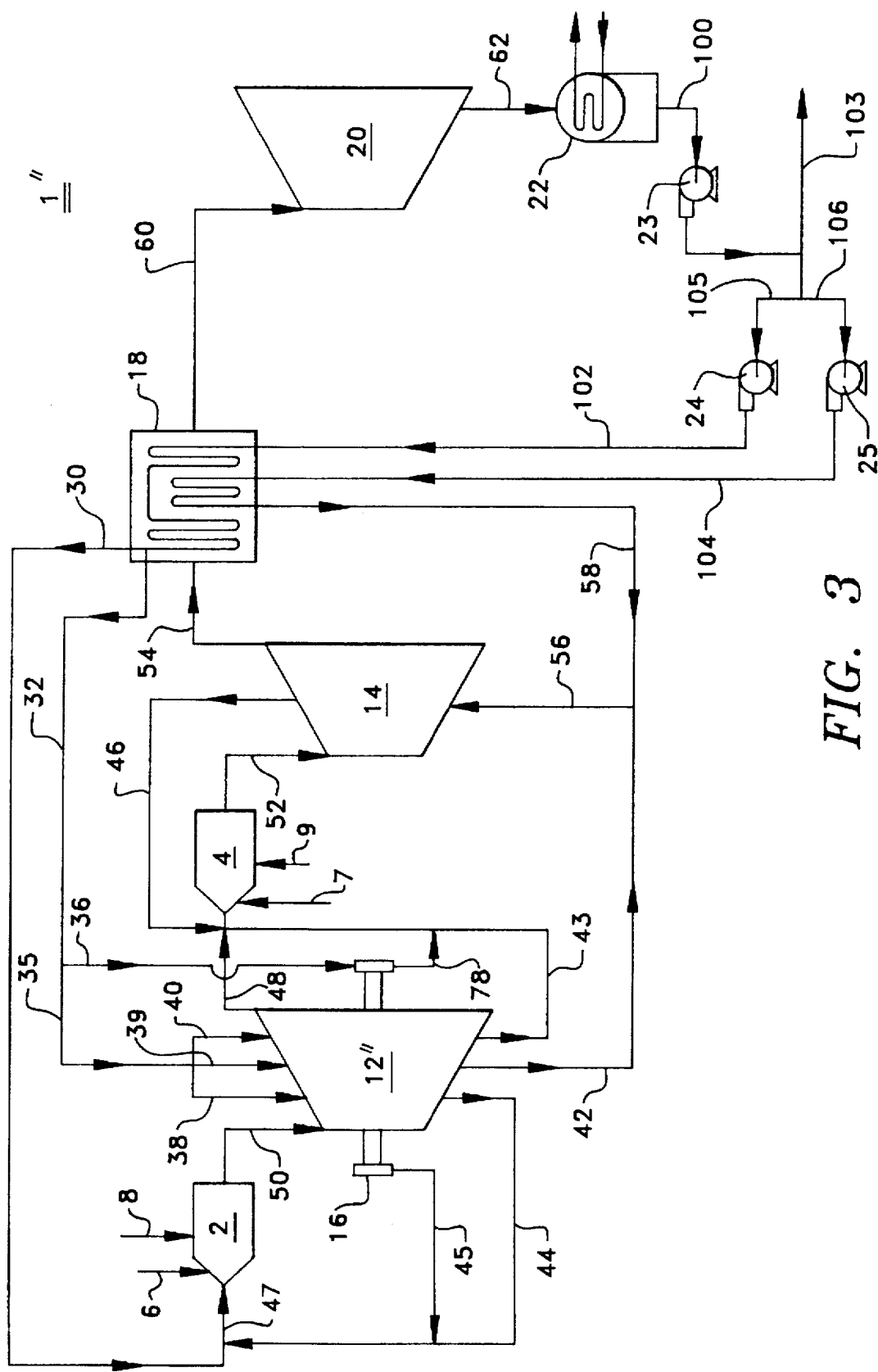

Now referring to FIG. 3, power plant 1" is another embodiment of the invention and is similar to power plant 1'. The main physical difference between the two power plants is that turbine 12' is replaced by turbine 12" which it cooled by numerous flows of cooling steam.

According to the current invention, the fourth flow of cooling steam 32 is further split into two streams 35 and 36, both of which are directed to the high pressure turbine 12 for cooling. The cooling steam 35 serves to cool the stationary vanes while cooling steam 36 cools the rotor 16, as discussed further below. The vane cooling steam 35 is divided into three streams 38, 39, and 40. Steam streams 38, 39, and 40 serve to cool the high, intermediate and low pressure vanes of the high pressure turbine 12, respectively, and, in the process become further heated. After they perform their cooling function, steam streams 38, 39 and 40 are discharged from the turbine 12" as heated steam streams 44, 42, and 43, respectively. The high pressure vane cooling steam 44 that is discharged from the high pressure turbine 12 forms a second portion of the temperature moderating steam 47 supplied to the high pressure combustor 2, the first portion being the first flow of cooling steam 30.

The intermediate pressure vane cooling steam 42 that is discharged from the high pressure turbine 12 is combined with the second flow of cooling steam 58 produced by the heat recovery steam generator 18, as previously discussed. The combined flow of steam 56 is then directed to the intermediate pressure turbine 14 for cooling of the turbine components using the techniques discussed below with reference to the cooling of the high pressure turbine 12. From the intermediate pressure turbine 14, the third flow of cooling steam 46, which has preferably been heated to approximately 650° C., along with the high pressure turbine cooling steam 43 and 78, is combined with the steam 48 discharged from the high pressure turbine 12 so as to form the remainder of the temperature moderating steam for the intermediate pressure combustor 4.

The second stream of cooling steam 36 cools the blades of the high pressure turbine rotor 16, after which it is discharged from the rotor in two streams 78 and 45. Stream 78, which cooled the lower pressure blades of the high pressure turbine 12, is combined with the low pressure vane cooling steam 43, where it serves to moderate the temperature in the intermediate pressure combustor 4, as previously discussed. Stream 45, which cooled the high pressure blades of the high pressure turbine 12, is combined with the high pressure vane cooling steam 44 and forms the third portion of the temperature moderating steam 47 supplied to the high pressure combustor 2.

In the preferred embodiment, all of the cooling of the high pressure turbine 12 is accomplished by the steam 32, thereby providing a very thermodynamically efficient system. As can be seen, the cooling system is closed-loop—that is, except for incidental leakages, all of the steam 32 supplied to the high pressure turbine 12 for cooling is returned to the cycle, along with the heat absorbed during the cooling.

The details of the closed-loop steam cooling system for the high pressure steam turbine 12 will now be discussed with reference to FIGS. 4 and 5. The cooling of the stationary vanes will be discussed first.

Figure 4:
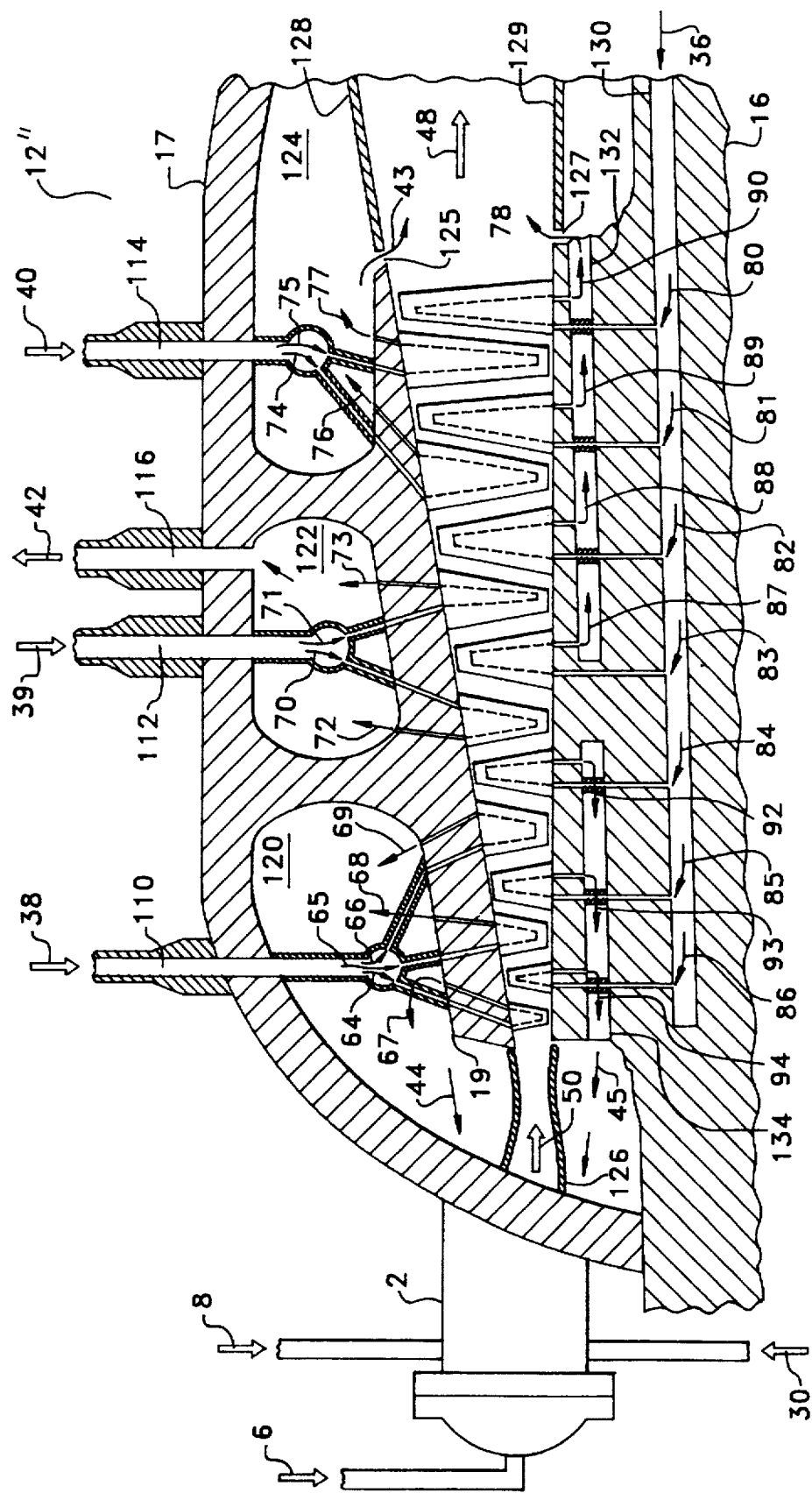
FIG. 4 is a longitudinal cross-section, partially schematic, through the high pressure turbine shown in FIG. 3.

As shown in FIG. 4, the high pressure turbine 12" is enclosed by an outer shell 17 that encloses an inner shell 19. The inner and outer shells 17 and 19 are connected by webs so as to form three plenums 120, 122 and 124 that serve to direct the flow of the cooling steam flows 38, 39 and 40, respectively. High pressure combustors 2 are attached to the front end of the outer shell 17. Ducts 126 extend through plenum 120 and direct the flow of the steam 50 from the high pressure combustors 2 to the inlet of the turbine working fluid flow path.

Figure 5:
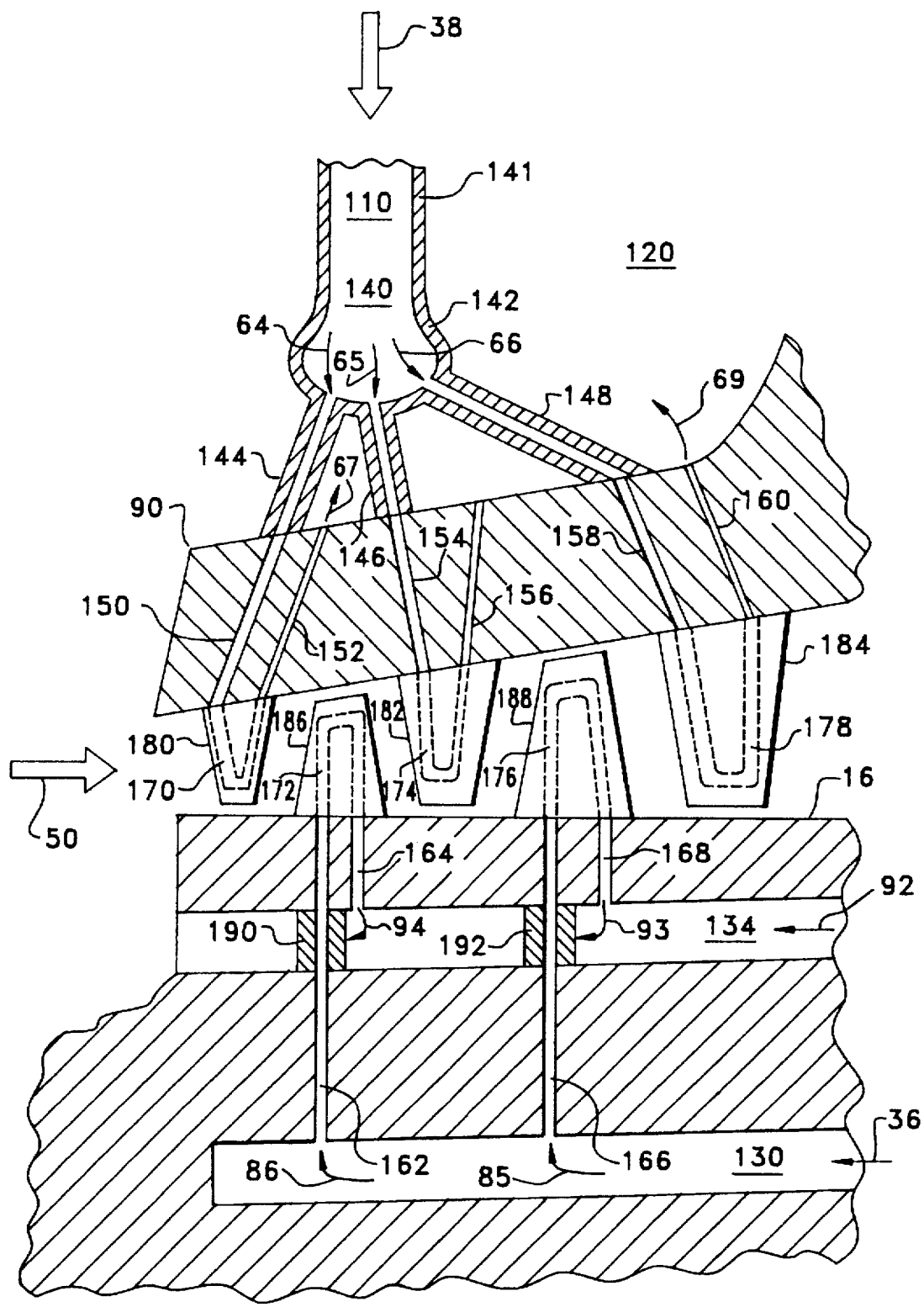
FIG. 5 is an enlarged view of FIG. 4 in the vicinity of the turbine inlet.

The high pressure vane cooling steam 38 enters the outer shell 17 through a passage 110 and is directed by a pipe 141 to a circumferentially extending pipe 142, as shown in FIG. 5. Pipe 142 forms a manifold 140 that divides the cooling steam 38 into three streams 64, 65, and 66 and distributes these streams to pipes 144, 146, and 148.

Steam 64 is directed by pipes 144 from the manifold 140 to passages 150 formed in the inner shell 19. The passages 150 direct the steam 64 to the first row stationary vanes 180 and then through cooling passages 170 formed in the vanes. As shown, each cooling passage 170 has a simple U-shaped configuration. However, as will be readily appreciated by those skilled in the art, the cooling passages 170 can take a variety of forms, such as serpentine. As a result of flowing through the cooling passages 170, a portion of the heat that was transferred from the combustor steam 50 to the vanes 180 is transferred from the vanes 180 to the cooling steam 64, thereby cooling the vanes and heating the cooling steam. From the vane cooling passages 170 the now heated steam 67 is directed by passages 152 to the plenum 120.

Similarly, pipes 146 and 148 direct steam 65 and 66, respectively, from the manifold 140 to passages 154 and 158, respectively, formed in the inner shell 19. The passages 154 and 158 direct the steam to passages 174 and 178, respectively, formed in the second and third rows of stationary vanes 182 and 184, respectively, thereby cooling the vanes. The now heated steam 68 and 69 from the cooling passages 174 and 178, respectively, is the directed by passages 156 and 160, respectively, formed in the inner shell 19, to the plenum 120.

As shown in FIG. 4, from the plenum 120, the combined flow 44 of heated cooling steam 67, 68, and 69 is directed by the plenum past the ducts 126 and into the high pressure combustors 2 where, as previously discussed, the steam 44 serves to moderate temperature and cool the combustors.

Still referring to FIG. 4, and in a manner similar to that discussed above with respect to the high pressure vane cooling steam 38, the cooling steam 39 for the intermediate pressure vanes of the high pressure turbine 12 enters the outer shell 17 through a passage 112 and is directed by a pipe to a circumferentially extending pipe that forms a manifold located within the plenum 122. The manifold divides the cooling steam 39 into two streams 70 and 71 that are then distributed to pipes that direct them to passages in the inner shell 19 and eventually to cooling passages in the fourth and fifth row stationary vanes. Additional passages formed in the inner shell 19 direct the now heated steam 72 and 73 from the vane cooling passages to the plenum 122. A passage 116 in the outer shell 17 directs the heated cooling steam 42 out of the plenum 122.

As previously discussed, the heated intermediate pressure vane cooling steam 42 is mixed with the second flow of cooling steam 58 from the heat recovery steam generator 18 and then directed to the intermediate pressure turbine 14 where it provides further cooling.

In a manner similar to that discussed above with respect to the intermediate pressure vane cooling steam 39, the cooling steam 40 for the low pressure vanes of the high pressure turbine 12 enters the outer shell 17 through a passage 114 and is directed by a pipe to a circumferentially extending pipe that forms a manifold located within the plenum 124. The manifold divides the cooling steam 40 into two streams 74 and 75 that are then distributed to pipes that direct them to passages in the inner shell 19 and eventually to cooling passages in the sixth and seventh row stationary vanes. Additional passages formed in the inner shell 19 direct the now heated cooling steam 76 and 77 from the vane cooling passages to the plenum 124. A gap 125 formed between an outer flow guide 128 and the inner shell 19 directs the combined flow 43 of heated cooling steam streams 76 and 77 from the plenum 124 to the working fluid flow path where it mixes with the partially expanded steam 48 discharged from the high pressure turbine 12. As previously discussed, cooling steam stream 43 is subsequently further heated, and expanded steam stream 48 is subsequently reheated, in the intermediate pressure combustor 4.

The closed-loop cooling system for the rotating blades will now be discussed. As shown in FIG. 4, the portion 36 of the cooling steam 32 from the heat recovery steam generator 18 enters the rotor 16 and flows axially upstream through a plurality of circumferentially distributed passages 130. Alternatively, the manifold 130 could be a single circular annular passage. The manifolds 130 distribute the cooling steam 36 to each of the rows of blades in the rotor 16 of the high pressure turbine 12.

Referring to FIG. 5, a portion 86 of the cooling steam 36 is directed by radially extending passages 162 formed in the rotor 16 from the manifolds 130 to the first row rotating blades 186 and then through cooling passages 172 formed in the blades. Bushings 190 prevent the cooling steam 86 from entering the manifold 134 directly. As shown, each cooling passage 172 has a simple U-shaped configuration. However, as will be readily appreciated by those skilled in the art, the cooling passages 172 can take a variety of forms, such as serpentine. As a result of flowing through the cooling passages 172, a portion of the heat that was transferred from the combustor steam 50 to the blades 186 is transferred from the blades 186 to the cooling steam 86, thereby cooling the blades and heating the cooling steam. From the blade cooling passages 172 the now heated steam 94 is directed by passages 164 to manifolds 134.

Similarly, the cooling steam 85 for the second row blades 188 flows through passages 166 and bushings 192 to cooling passages 176 formed in the second row blades 188. Passages 168 direct the now heated cooling steam 93 to the manifold 134. Returning to FIG. 4, in a similar manner, cooling 84 is provided to the third row blades. The combined flow 45 of heated cooling steam 92, 93, and 94 from the first three rows of blades is directed by the manifold 134 to the plenum 120. From the plenum 120, the high pressure blade cooling steam 45 is directed, along with the high pressure vane cooling steam 44, by the plenum past the ducts 126 and into the high pressure combustors 2 where, as previously discussed, the steam streams 44 and 45 serve to moderate temperature.

As also shown in FIG. 4, the rotor manifold 130 also distributes steam flows 80–83 to the fourth through seventh rows of rotating blades. The streams of heated cooling steam 87–90 from these rows is directed by a manifold 132 to a gap 127 formed between an inner flow guide 129 and the rotor 16. From the gap 127, the combined flow 78 of heated cooling steam from the low pressure blades of the high pressure turbine 12" is then directed to the working fluid flow path, where it mixes with the partially expanded steam 48 discharged from the high pressure turbine 12". As previously discussed, the low pressure blade cooling steam 78, along with the low pressure vane cooling steam 43, is subsequently further heated in the intermediate pressure combustor 4.

The closed-loop steam cooling system in the high pressure turbine previously discussed permits very effective cooling, thereby enabling the expansion of first flow of process steam 50 in the high pressure turbine. Further, since essentially all of the cooling steam is returned to the cycle, the thermodynamic losses associated with prior vane and blade cooling schemes have been eliminated. Further, while the present invention was discussed with reference to a high pressure turbine, the invention is also applicable to other turbines of the plant.

As previously disclosed for plants 1 and 1', other embodiments of the invention has the intermediate pressure turbine 14 in plant 1" having either an open- or closed-loop steam cooling system, with the embodiment of the invention shown in FIG. 3 having a closed-loop steam cooling system. If plant 1" has an open-loop steam cooling system, there will not be a third flow of cooling steam 46, necessitating a modification of the operating parameters of plant 1".

The power plant of the invention enables high efficiency power generation from the combustion of hydrogen using closed loop steam cooling of the components of the invention. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. A method of generating rotating shaft power, comprising the steps of:
   a) feeding a first flow of cooling steam, a first flow of hydrogen, and a first flow of oxygen into a high pressure combustor;
   b) combusting the first flows of hydrogen and oxygen into high pressure steam and mixing the high pressure steam with the first flow of cooling steam in the high pressure combustor to produce a first flow of process steam;
   c) expanding the first flow of process steam in a high pressure turbine to produce shaft power and a second flow of process steam;
   d) feeding the second flow of process steam, a second flow of hydrogen, and a second flow of oxygen into an intermediate pressure combustor;
   e) combusting the second flows of hydrogen and oxygen into steam and mixing the steam with the second flow of process steam in the intermediate pressure combustor to produce a third flow of process steam;
   f) expanding the third flow of process steam in an intermediate pressure turbine to produce shaft power and a fourth flow of process steam;
   g) cooling the fourth flow of process steam in a heat recovery steam generator to produce a fifth flow of process steam;
   h) expanding the fifth flow of process steam in a low pressure turbine to produce shaft power and a sixth flow of process steam;
   i) condensing the sixth flow of process steam in a condenser to produce a feedwater stream;
   j) feeding a first portion and a second portion of the feedwater stream to a high pressure feedwater pump and a low pressure feedwater pump, respectively, to produce a high pressure water stream and a low pressure water stream, respectively;
   k) pumping the high pressure water stream from the high pressure feedwater pump into the heat recovery steam generator to produce the first flow of cooling steam;
   l) pumping the low pressure water stream from the low pressure feedwater pump into the heat recovery steam generator to produce the second flow of cooling steam;
   m) cooling the intermediate pressure turbine with the second flow of cooling steam; and
   n) bleeding off of an excess portion of the feedwater stream.

2. The method of claim 1, wherein the intermediate pressure turbine comprises an open-loop steam cooling system.

3. The method of claim 2,
   further comprising the step of o) cooling the high pressure turbine with a fourth flow of cooling steam;
   wherein:
   the high pressure turbine comprises an open-loop cooling system; and
   step k) further comprises the step of producing the first flow of cooling steam and the fourth flow of cooling steam.

4. The method of claim 1, wherein:
   the intermediate pressure turbine comprises a closed-loop steam cooling system;
   step d) further comprises feeding a third flow of cooling steam into the intermediate pressure combustor;

step e) further comprises mixing the steam formed by combusting the second flows of hydrogen and oxygen with the third flow of cooling steam in the intermediate pressure combustor to produce a third flow of process steam; and step m) further comprises the step of cooling the intermediate pressure turbine with the second flow of cooling steam to produce the third flow of cooling steam.

5. The method of claim 4, wherein:

step b) further comprises the step of heating the first flow of process steam to between approximately 500° C. and approximately 900° C. and pressurizing the first flow of process steam to between approximately 200 bar and approximately 500 bar;

step c) further comprises the step of adjusting the pressure of the second flow of process steam to approximately 40 bar;

step e) further comprises the step of heating the third flow of process steam to between approximately 1500° C. and approximately 1700° C. and adjusting the pressure of the third flow of process steam to between approximately 20 bar and approximately 40 bar;

step f) further comprises the step of adjusting the pressure of the fourth flow of process steam to approximately 1 bar;

step g) further comprises the step of adjusting the temperature of the fifth flow of process steam to approximately 110° C.;

step h) further comprises the step of adjusting the temperature of the sixth flow of process steam to approximately 35° C. and adjusting the pressure of the sixth flow of process steam to approximately 0.1 bar;

step k) further comprises the step of heating the first flow of cooling steam to approximately 440° C. and pressurizing the first flow of cooling steam to approximately 470 bar; and step l) further comprises the step of heating the second flow of cooling steam to approximately 260° C. and pressurizing the second flow of cooling steam to approximately 45 bar.

6. The method of claim 5, wherein:

step b) further comprises the step of heating the first flow of process steam to approximately 650° C. and pressurizing the first flow of process steam to approximately 300 bar; and step e) further comprises the step of heating the third flow of process steam to approximately 1700° C. and adjusting the pressure of the third flow of process steam to approximately 39 bar.

7. The method of claim 4, further comprising the step of o) cooling the high pressure turbine with a fourth flow of cooling steam to produce a fifth flow of cooling steam;

wherein:

the high pressure turbine comprises a closed-loop cooling system;

step a) further comprises the step of feeding the fifth flow of cooling steam into the high pressure combustor;

step b) further comprises the step of combusting the first flows of hydrogen and oxygen into high pressure steam and mixing the high pressure steam with the fifth flow of cooling steam in the high pressure combustor; and step k) further comprises the step of producing the first flow of cooling steam and the fourth flow of cooling steam.

8. The method of claim 7, wherein:

step b) further comprises the step of heating the first flow of process steam to approximately 1600° C. and pressurizing the first flow of process steam to approximately 250 bar;

step c) further comprises the step of adjusting the temperature of the second flow of process steam to approximately 935° C. and adjusting the pressure of the second flow of process steam to approximately 25 bar;

step e) further comprises the step of heating the third flow of process steam to between approximately 1600° C. and approximately 1700° C. and adjusting the pressure of the third flow of process steam to approximately 24 bar;

step f) further comprises the step of adjusting the temperature of the fourth flow of process steam to approximately 840° C. and adjusting the pressure of the fourth flow of process steam to approximately 1 bar;

step g) further comprises the step of adjusting the temperature of the fifth flow of process steam to 110° C. and adjusting the pressure of the fifth flow of process steam to approximately 1 bar;

step h) further comprises the step of adjusting the temperature of the sixth flow of process steam to approximately 33° C. and adjusting the pressure of the sixth flow of process steam to approximately 0.05 bar;

step k) further comprises the step of heating the first and fourth flows of cooling steam to approximately 400° C., pressurizing the first flow of cooling steam to approximately 260 bar, and pressurizing the fourth flow of cooling steam to approximately 310 bar;

step l) further comprises the step of heating the second flow of cooling steam to approximately 375° C. and pressurizing the second flow of cooling steam to 30 bar;

step m) further comprises the step of heating the third flow of cooling steam to approximately 650° C. and adjusting the pressure of the third flow of cooling steam to approximately 27 bar; and step o) further comprises the step of heating the fifth flow of cooling steam to approximately 650° C. and adjusting the pressure of the fifth flow of cooling steam to approximately 280 bar.

9. The method of claim 7, wherein:

the high pressure turbine has a plurality of components;

step k) further comprises the step of producing the first flow of cooling steam and a fourth flow of cooling steam;

further comprising the steps of:

p) directing a first portion of the fourth flow of cooling steam through at least a first portion of the high pressure turbine components and transferring heat from the first portion of the high pressure turbine components to the first portion of the fourth flow of cooling steam to generate a first flow of heated cooling steam;

q) mixing the first flow of heated cooling steam with the first flow of process steam;

r) directing a second portion of the fourth flow of cooling steam through a second portion of the high pressure turbine components and transferring heat from the second portion of the high pressure turbine components to the second portion of the fourth flow of cooling steam to produce a second flow of heated cooling steam;

s) mixing the second flow of heated cooling steam with the second flow of cooling steam;

t) directing a third portion of the fourth flow of cooling steam through a third portion of the high pressure turbine components and transferring heat from the third portion of the high pressure turbine components to the third portion of the fourth flow of cooling steam to produce a third flow of heating cooling steam; and u) mixing the third flow of heated cooling steam with the second flow of process steam.

10. The method of claim 9, wherein the first, second, and third portions of turbine components comprise a first, a second, and a third plurality of stationary vanes and rotating blades, respectively.

11. The method of claim 4, further comprising the step of o) cooling the high pressure turbine with a fourth flow of cooling steam;

wherein:

the high pressure turbine comprises an open-loop cooling system; and step k) further comprises the step of producing the first flow of cooling steam and the fourth flow of cooling steam.

12. A power plant comprising:

a) a high pressure combustor having:
  i) means for receiving a first flow of cooling steam, a first flow of hydrogen, and a first flow of oxygen; and
  ii) means for combusting the first flows of hydrogen and oxygen into high pressure steam and mixing the high pressure steam with the first flow of cooling steam to produce a first flow of process steam;

b) a high pressure turbine having means for receiving and expanding the first flow of process steam to produce shaft power and a second flow of process steam;

c) an intermediate pressure combustor having:
  i) means for receiving the second flow of process steam, a second flow of hydrogen, and a second flow of oxygen; and
  ii) means for combusting the second flows of hydrogen and oxygen into steam and mixing the steam with the second flow of process steam to produce a third flow of process steam;

d) an intermediate pressure turbine having:
  i) means for receiving and expanding the third flow of process steam to produce shaft power and a fourth flow of process steam; and
  ii) means for cooling the intermediate pressure turbine with a second flow of cooling steam;

e) a heat recovery steam generator having:
  i) means for receiving and cooling the fourth flow of process steam to produce the fifth flow of process steam;
  ii) means for receiving a high pressure water stream and producing the first flow of cooling steam; and
  iii) means for receiving a low pressure water stream and producing the second flow of cooling steam;

f) a low pressure turbine having means for receiving and expanding the fifth flow of process steam to produce shaft power and a sixth flow of process steam;

g) a condenser having means for receiving and condensing the sixth flow of process steam to produce a feedwater stream;

h) a high pressure pump having receiving and pumping means for receiving a first portion of the feedwater stream and pumping it to produce the high pressure water stream;

i) a low pressure pump having receiving and pumping means for receiving a second portion of the feedwater stream and pumping it to produce the low pressure water stream; and j) bleeding means for bleeding off an excess portion of the feedwater stream.

13. The power plant of claim 12, wherein the means for cooling the intermediate pressure turbine comprises an open-loop steam cooling system with means for receiving the second flow of cooling steam and means for mixing the second flow of cooling steam with the third flow of process steam.

14. The power plant of claim 13, wherein:

the heat recovery steam generator comprises means for receiving the high pressure water stream and producing a fourth flow of cooling steam;

the high pressure turbine comprises an open-loop steam cooling system with means for receiving the fourth flow of cooling steam and means for mixing the fourth flow of cooling steam with the first flow of process steam.

15. The power plant of claim 12, wherein:

the means for cooling the intermediate pressure turbine comprises a closed-loop steam cooling system with means for receiving the second flow of cooling steam and means for producing a third flow of cooling steam; and the intermediate pressure combustor has means for receiving the third flow of cooling steam and mixing the third flow of cooling steam with the steam produced by combusting the second flows of hydrogen and oxygen.

16. The power plant of claim 15, wherein:

the heat recovery steam generator comprises means for receiving the high pressure water stream and producing a fourth flow of cooling steam;

the high pressure turbine comprises an closed-loop steam cooling system with means for receiving the fourth flow of cooling steam and means for producing a fifth flow of cooling steam; and the high pressure combustor has means for receiving the fifth flow of cooling steam and mixing the fifth flow of cooling steam with the high pressure steam.

17. The power plant of claim 15, wherein:

the heat recovery generator has means for receiving a high pressure water stream and producing the first flow of cooling steam and a fourth flow of cooling steam;

the high pressure turbine comprises:
  i) turbine components;
  ii) means for receiving a first portion of the fourth flow of cooling steam and cooling a first portion of the turbine components with the first portion of the fourth flow of cooling steam to produce a first flow of heated cooling steam;
  iii) means for receiving a second portion of the fourth flow of cooling steam and cooling a second portion of the turbine components with the second portion of the fourth flow of cooling steam to produce a second flow of heated cooling steam; and
  iv) means for receiving a third portion of the fourth flow of cooling steam and cooling a third portion of the turbine components with the third portion of the fourth flow of cooling steam to produce a third flow of heated cooling steam.

18. The power plant of claim 17, wherein the first, second, and third portions of turbine components comprise a first, a second, and a third plurality of stationary vanes and rotating blades, respectively.

19. The power plant of claim 17, wherein:

the high pressure combustor has means for receiving the first flow of heated cooling steam and means for mixing the first flow of heated cooling steam with the first flow of cooling steam;

the intermediate pressure turbine has means for receiving the second flow of heated cooling steam and means for cooling the intermediate pressure turbine with the second flow of heated cooling steam; and the intermediate pressure combustor has means for receiving the third flow of heated cooling steam and means for mixing the third flow of heated cooling steam with the second flow of process steam and the third flow of cooling steam.

20. The power plant of claim 15, wherein:

the heat recovery steam generator comprises means for receiving the high pressure water stream and producing a fourth flow of cooling steam;

the high pressure turbine comprises an open-loop steam cooling system with means for receiving the fourth flow of cooling steam and means for mixing the fourth flow of cooling steam with the first flow of process steam.

21. The power plant of claim 13, wherein:

the heat recovery steam generator comprises means for receiving the high pressure water stream and producing a fourth flow of cooling steam;

the high pressure turbine comprises an closed-loop steam cooling system with means for receiving the fourth flow of cooling steam and means for producing a fifth flow of cooling steam; and the high pressure combustor has means for receiving the fifth flow of cooling steam and mixing the fifth flow of cooling steam with the high pressure steam.

* * * * *